(12) United States Patent
Endrullat

(10) Patent No.: US 10,688,606 B2
(45) Date of Patent: Jun. 23, 2020

(54) WORKPIECE RECEPTACLE

(71) Applicant: Pentracor GmbH, Hennigsdorf (DE)

(72) Inventor: Thomas Endrullat, Schulzendorf (DE)

(73) Assignee: Pentracor GmbH, Hennigsdorf (DE)

( * ) Notice: Subject to any disclaimer, the term of this patent is extended or adjusted under 35 U.S.C. 154(b) by 64 days.

(21) Appl. No.: 15/580,780

(22) PCT Filed: Jun. 6, 2016

(86) PCT No.: PCT/EP2016/062814
§ 371 (c)(1),
(2) Date: Dec. 8, 2017

(87) PCT Pub. No.: WO2016/202624
PCT Pub. Date: Dec. 22, 2016

(65) Prior Publication Data
US 2018/0221998 A1    Aug. 9, 2018

(30) Foreign Application Priority Data
Jun. 16, 2015 (EP) .................................... 15172248

(51) Int. Cl.
| B23K 37/04 | (2006.01) |
| B29C 65/08 | (2006.01) |
| B23Q 1/54 | (2006.01) |
| B29C 65/00 | (2006.01) |
| B23K 20/10 | (2006.01) |

(52) U.S. Cl.
CPC .......... *B23K 37/0452* (2013.01); *B23K 20/10* (2013.01); *B23K 37/0408* (2013.01); *B23K 37/0461* (2013.01); *B23Q 1/545* (2013.01); *B29C 65/08* (2013.01); *B29C 66/8163* (2013.01)

(58) Field of Classification Search
CPC ..... B23Q 1/545; B29C 65/08; B29C 66/8163; B23K 37/04–0538; B23K 20/10–106; B23K 1/06
USPC .......................... 228/1.2, 110.1, 44.3–49.6; 156/73.1–73.6, 580.1–580.2
See application file for complete search history.

(56) References Cited

U.S. PATENT DOCUMENTS

| 1,423,774 A | * | 7/1922 | Moore ...................... B25B 1/22 |
| | | | 269/73 |
| 1,644,437 A | * | 10/1927 | Lofquist ................ B23Q 1/545 |
| | | | 269/280 |
| 2,068,957 A | * | 1/1937 | Marcus ................ A43D 23/025 |
| | | | 269/258 |
| 2,129,774 A | * | 9/1938 | Kuhner .................. B21D 11/02 |
| | | | 72/305 |

(Continued)

FOREIGN PATENT DOCUMENTS

| DE | 1213408 U | 8/1972 |
| DE | 2217318 A1 | 10/1973 |

(Continued)

*Primary Examiner* — Kiley S Stoner
(74) *Attorney, Agent, or Firm* — The Webb Law Firm

(57) ABSTRACT

Disclosed is a workpiece receptacle, in particular for an ultrasonic welding device, that has a receiving element for receiving a workpiece. The receiving element can be moved in relation to a base element. A bearing device is disposed between the receiving element and the base element for this purpose. The bearing device has spherical surfaces lying opposite one another.

16 Claims, 1 Drawing Sheet

(56) References Cited

U.S. PATENT DOCUMENTS

| | | | | |
|---|---|---|---|---|
| 2,405,773 | A * | 8/1946 | Barrett | B23Q 3/154 335/287 |
| 3,487,192 | A | 12/1969 | Hill | |
| 4,073,483 | A * | 2/1978 | Smith | B23K 26/10 269/127 |
| 4,352,489 | A * | 10/1982 | Wagster | B23Q 1/28 269/139 |
| 4,491,306 | A * | 1/1985 | Eickhorst | B23Q 1/76 269/21 |
| 4,986,503 | A * | 1/1991 | Kabat | B63B 17/00 248/181.2 |
| 5,190,205 | A * | 3/1993 | Ozawa | B23K 20/021 228/44.7 |
| 5,280,225 | A * | 1/1994 | Pine | B23Q 1/545 310/13 |
| 5,395,098 | A * | 3/1995 | Eickhorst | B23Q 1/545 269/21 |
| 5,590,870 | A * | 1/1997 | Goellner | B25B 5/003 269/21 |
| 5,607,268 | A * | 3/1997 | Edis | B25B 11/005 269/21 |
| 5,639,160 | A * | 6/1997 | Kishimoto | B01F 11/0028 366/208 |
| 6,012,711 | A * | 1/2000 | Cipolla | B23Q 3/186 269/20 |
| 6,019,154 | A * | 2/2000 | Ma | B23K 20/10 100/258 R |
| 6,083,333 | A | 7/2000 | Van Beers et al. | |
| 6,318,694 | B1 * | 11/2001 | Watanabe | F16M 11/10 248/178.1 |
| 6,454,333 | B2 * | 9/2002 | Portal | B23Q 1/5462 269/21 |
| 6,550,127 | B1 * | 4/2003 | Auracher | F16C 11/06 269/20 |
| 6,575,443 | B2 * | 6/2003 | Kick | B25B 11/00 269/21 |
| 6,972,044 | B2 * | 12/2005 | Inoue | B23K 20/10 29/2 |
| 7,114,941 | B2 * | 10/2006 | Huang | B29C 59/002 425/193 |
| 7,241,070 | B2 * | 7/2007 | McMurtry | B25J 17/0266 269/75 |
| 7,404,512 | B2 * | 7/2008 | Baumann | B23K 20/126 228/2.1 |
| 7,522,047 | B2 * | 4/2009 | Belden, Jr. | A47F 5/12 248/133 |
| 7,891,111 | B2 * | 2/2011 | Mauro | G01B 5/24 33/1 M |
| 8,695,958 | B2 * | 4/2014 | Marrinan | B23Q 1/035 269/315 |
| 9,459,083 | B2 * | 10/2016 | Hester | G01B 5/24 |
| 2002/0062902 | A1 * | 5/2002 | Couillard | B29C 65/087 156/73.1 |
| 2002/0148131 | A1 * | 10/2002 | Mauro | B23Q 1/50 33/569 |
| 2010/0074786 | A1 * | 3/2010 | Juan | F02B 53/12 418/195 |
| 2010/0115885 | A1 | 5/2010 | Anderson | |
| 2012/0195541 | A1 * | 8/2012 | Friedrich | F16C 33/4611 384/576 |
| 2013/0112736 | A1 * | 5/2013 | Kato | B23K 20/125 228/112.1 |
| 2013/0200561 | A1 * | 8/2013 | Sun | B25H 1/02 269/59 |
| 2013/0266248 | A1 * | 10/2013 | Wolf | F16C 19/49 384/452 |
| 2013/0272640 | A1 * | 10/2013 | Mola | F16C 33/3887 384/523 |
| 2014/0263587 | A1 * | 9/2014 | Sexton | F16C 33/00 228/213 |
| 2015/0377289 | A1 * | 12/2015 | Scheidel | F16C 33/6614 384/527 |
| 2017/0197741 | A1 * | 7/2017 | Carvin | B65D 77/2024 |

FOREIGN PATENT DOCUMENTS

| | | | | |
|---|---|---|---|---|
| DE | 2551339 | A1 * | 5/1977 | B23K 37/0452 |
| DE | 3930629 | A1 * | 3/1991 | B23K 37/0452 |
| EP | 0461994 | A1 * | 12/1991 | B23Q 1/545 |
| EP | 0995541 | A2 | 4/2000 | |
| EP | 2818304 | A1 | 12/2014 | |
| JP | S4819669 | U | 3/1973 | |
| JP | 57160598 | A * | 10/1982 | B23K 37/053 |
| JP | 60123820 | A * | 7/1985 | B23Q 1/545 |
| WO | WO-2005001844 | A1 * | 1/2005 | B23Q 1/38 |
| WO | 2008136683 | A1 | 11/2008 | |

* cited by examiner

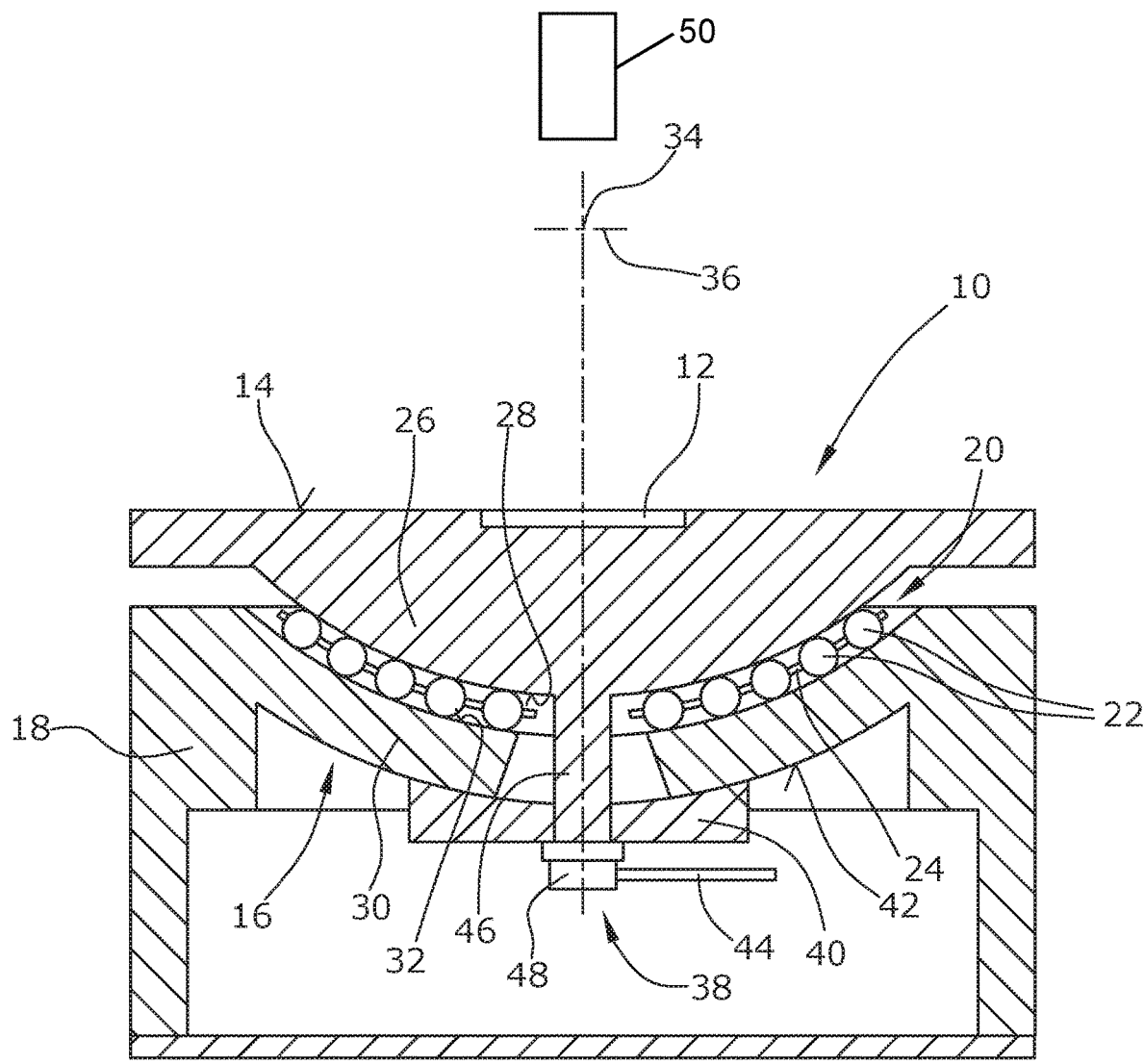

WORKPIECE RECEPTACLE

CROSS-REFERENCE TO RELATED APPLICATIONS

This application is the United States national phase of International Application No. PCT/EP2016/062814 filed Jun. 6, 2016, and claims priority to European Patent Application No. 15172248.5 filed Jun. 16, 2015, the disclosures of which are hereby incorporated in their entirety by reference.

BACKGROUND OF THE INVENTION

Field of the Invention

The invention relates to a workpiece receptacle. The workpiece receptacle is suited in particular for a positionally accurate receipt of workpieces for the processing thereof, such as in particular in presses and punches. The workpiece receptacle of the present invention is particularly suited for an ultrasonic welding device.

Technical Considerations

Ultrasonic welding devices are used to join plastic parts. For an in particular tight welding of two plastic parts using the ultrasonic welding device, it is necessary that the two parts to be joined by welding are aligned plane-parallel with each other in a highly precise manner. This may be possible using known devices, but it is extremely complex. In particular, each single part has to be aligned individuals in the device.

An exact alignment of workpieces is also desired in other processing devices. Specifically, this is also advantageous in pressing and punching.

SUMMARY OF THE INVENTION

It is an object of the invention to provide a workpiece receptacle which, in a simple manner, allows for an exact alignment of e.g. parts to be joined by welding, to be punched or to be pressed.

The object is achieved according to the invention with the features of claim 1.

The workpiece receptacle of the present invention is suited for an exact receipt and alignment of workpieces, e.g. for the welding, punching or pressing of parts.

The workpiece receptacle of the present invention will be described hereunder in more detail for the purpose of clarification and in connection with an ultrasonic welding device.

The workpiece receptacle of the present invention comprises a receiving element for receiving the workpiece. It is possible, for example, to arrange one of the two parts to be welded or already both parts to be welded on this receiving element. The in particular two parts may be fixed using holding and/or clamping devices connected with the receiving element. For the alignment of the at least one part to be welded, the receiving element is received or supported by a base element. The base element itself is preferably stationary. A bearing means is arranged between the base element and the receiving element so as to allow the receiving element to be moved relative to the base element. Thereby, it is possible to align the receiving element and thus the at least one workpiece supported by the receiving element. According to the invention, the receiving element is connected to a bearing cup, where the bearing cup and the receiving element may also be formed as a single piece. In particular, an outer side of the receiving element forms the bearing cup. Correspondingly, the base element is also connected with a bearing cup, where the base element and the bearing cup may again be formed as a single piece and it is particularly preferred that an outer side of the base element forms the bearing cup. According to the invention the two bearing cups have a spherical surface. Thus, it is possible, using the workpiece receptacle of the present invention, to spatially align the at least one workpiece supported by the receiving element, the alignment being made using a single workpiece receptacle. In contrast with conventional workpiece receptacles it is not necessary to perform an alignment by two axes. This would be significantly more complex.

Preferably, the two spherical surfaces of the bearing cups are arranged concentrically with respect to each other. In particular, the two bearing cups or the two spherical surfaces of the bearing cups have the same centre. It is particularly preferred to arrange the at least one workpiece to be welded on the receiving element such that a welding plane extends through the common centre. If, for example, a hollow cylindrical body is welded to a lid, it is preferred that the welding surface, which in this case is in particular annular in shape, forms the welding plane and that the same extends through the common centre of the spherical surface. It is particularly preferred that the workpiece to be welded is arranged such that the centre of the annular welding surface coincides with the common centre of the spherical surfaces. It is now possible to arrange the second workpiece, such as a lid, on the cylindrical body. If, for example, the ultrasonic welding device is lowered onto the lid, an automatic alignment of the two parts to be joined by welding is effected.

Preferably, balls are arranged between the two bearing cups. Instead of the balls, it is also possible to provide grease or another lubricant. Further, the nearing could be designed as a sliding bearing, where the design as a ball bearing is preferred.

Further, it is preferred that the balls are arranged at a defined mutual distance. Preferably, a bearing cage is provided that in particular maintains the balls at a constant mutual distance. Due to the preferred equidistant arrangement of the balls, a uniform movement of the receiving element is ensured relative to the base element.

Although an automatic alignment of the welding plane may be effected by lowering or pressing the welding device, it is preferred to additionally provide a fixing element for the fixation of the receiving element with respect to the base element. This may be effected by clamping or the like. The fixing element helps to avoid a shifting during the welding process. Likewise, it would be possible, using the fixing element, to effect an intentional inclination of workpiece. The fixing element may e.g. comprise electromagnets which are energized for the purpose of fixation. This has the advantage that no mechanical fixing element has to be provided. If a mechanical fixing element were provided, an unintentional adjustment could occur. In a simple embodiment, the fixing element may, however, comprise a tensioning element which may be tensioned in particular via a lever element.

In a particularly preferred development of the invention an adjustment element is provided. The adjustment element serves to adjust the workpiece such that the welding plane extends through the centre of the two spherical surfaces. Thus, using the adjustment element, it is possible to exactly adjust different workpieces using the same workpiece receptacle. In this regard it is possible that, depending on the workpiece to be welded, a respective workpiece-specific adjustment element is provided. The adjustment element corresponds to a kind of additional receptacle. The same is arranged on the receiving element and serves to receive the workpiece. As an alternative, it is also possible, however, to provide an adjustment element that e.g. allows for a horizontal displacement of the workpiece.

The invention further relates to a welding apparatus with a welding device and a workpiece receptacle, where the workpiece receptacle is the above-described, in particular advantageously developed workpiece receptacle. Further, a closing device 50 is provided for moving the welding device relative to a workpiece arranged in the workpiece receptacle. In this case, in particular an automatic alignment may occur so that the surfaces to be joined by welding are parallel to each other.

The workpiece receptacle described above, in particular also with reference to preferred developments, is not only suited for ultrasonic welding devices, but also for other devices for processing workpieces. In particular, the workpiece receptacle is suited for pressing or punching devices.

BRIEF DESCRIPTION OF THE DRAWING

The invention will be explained in more detail hereunder with reference to a preferred embodiment and to the accompanying drawing.

FIG. 1 illustrates a schematic sectional view of a workpiece receptacle suited in particular for a welding apparatus, but also for other devices for the processing of workpieces.

DESCRIPTION OF THE INVENTION

The workpiece receptacle illustrated in FIG. 1 comprises a receiving element 10 for receiving a workpiece. Here, the workpiece may be arranged on the receiving element 10 e.g. in a recess 12 serving in particular for adjustment purposes. It is also possible to provide clamping and/or holding devices e.g. on an upper surface 14 of the receiving element 10. The receiving element 10 is movable with respect to a base element 16. In the embodiment illustrated the base element 16 is supported by a frame element 18 and is stationary. To allow for a movement between the receiving element and the base element, a bearing means 20 is provided. In the embodiment illustrated, the bearing means 20 comprises a plurality of balls 22. The balls 22 are regularly distributed or equidistantly arranged between the receiving element 10 and the base element 16. For this purpose, a bearing cage 24 is provided in the embodiment illustrated. For forming the bearing means, a lower side of the receiving element 12, as illustrated in FIG. 1, is designed as a bearing cup 26 by shaping the lower side of the receiving element 10 as a spherical surface 28. The part of the base element 16 opposite the bearing cup 26 is designed as a bearing cup 30. A surface 32 directed towards the surface 28 is also designed as a spherical surface. The two spherical surfaces 28, 32 forming the surfaces of the bearing cups are at a constant distance from each other. In particular, the two spherical surfaces 28, 32 have the same centre 34.

For welding two workpieces, the same can be arranged on the upper surface 14 of the receiving element and may, for example, be fixed or held. However, the arrangement of the workpieces is preferably such that the welding plane of the workpieces is in a plane 36 passing through the common centre 34 of the two spherical surfaces 28, 32. Thus, it is possible in particular to lower a welding device from above onto the workpieces to be welded, so that the parts to be welded are thereby in particular aligned automatically or self-actingly in the welding plane 36 in a plane-parallel manner.

Further, it is possible to fix the receiving element 10, and thus also the workpiece arranged on the receiving element 10, with respect to the base element 16. This could be effected e.g. by fixing elements having electromagnets or the like. As shown in the embodiment illustrated it is possible to provide a holding element 38. In the embodiment illustrated the same has an abutment element 40 resting on a lower side 42 of the base element 16. Using a lever 44 connected with a nut 48 arranged on a threaded rod 46, a clamping fixation of the receiving element 10 relative to the base element 16 can be effected.

The invention claimed is:

1. A workpiece receptacle for a workpiece comprising:
    a receiving element for receiving the workpiece,
    a base element movably receiving the receiving element,
    a fixing element comprising a threaded rod for fixing the receiving element with respect to the base element, the fixing element configured to mechanically clamp the receiving element with respect to the base element,
    a bearing element comprising one or more ball bearings allowing for a movement between the receiving element and the base element, wherein the one or more ball bearings are spherical and wherein the one or more ball bearings are disposed in one or more rows,
    a first bearing cup connected with the receiving element, the first bearing cup being integral with the fixing element, and
    a second bearing cup connected with the base element, wherein
    both the first bearing cup and the second bearing cup have a spherical surface.

2. The workpiece receptacle of claim 1, wherein the spherical surface of the first bearing cup and the spherical surface of the second bearing cup are arranged concentrically with regard to each other and in particular have a same center.

3. The workpiece receptacle of claim 2, wherein a processing plane passes through the same center.

4. The workpiece receptacle of claim 1, wherein balls are provided between the first bearing cup and the second bearing cup.

5. The workpiece receptacle of claim 4, wherein the balls are retained by a bearing cage.

6. The workpiece receptacle of claim 5, wherein the balls are arranged equidistantly.

7. The workpiece receptacle of claim 1, wherein the fixing element has a tensioning element for tensioning the receiving element with respect to the base element so as to fix the receiving element with respect to the base element.

8. The workpiece receptacle of claim 1, further comprising a holding element for holding a workpiece support on the receiving element.

9. The workpiece receptacle of claim 3, further comprising an adjustment element for adjusting the workpiece such that the processing plane passes through the same center.

10. The workpiece receptacle of claim 9, wherein the adjustment element allows for a displacement of the workpiece.

11. A welding apparatus comprising:
    an ultrasonic welding device,
    the workpiece receptacle of claim 1, and
    a closing device for moving the ultrasonic welding device relative to the workpiece arranged in the workpiece receptacle.

12. The workpiece receptacle of claim 3, wherein the processing plane is a welding plane.

13. The workpiece receptacle of claim 6, wherein the balls are arranged equidistantly because of the bearing cage.

14. The workpiece receptacle of claim 1, wherein the fixing element and the first bearing cup are integrally formed.

15. The workpiece receptacle of claim 1, wherein the fixing element and the first bearing cup are monolithically formed.

16. The workpiece receptacle of claim 1, wherein the fixing element is fixed to the first bearing cup.

* * * * *

UNITED STATES PATENT AND TRADEMARK OFFICE
CERTIFICATE OF CORRECTION

PATENT NO. : 10,688,606 B2
APPLICATION NO. : 15/580780
DATED : June 23, 2020
INVENTOR(S) : Thomas Endrullat Page 1 of 1

It is certified that error appears in the above-identified patent and that said Letters Patent is hereby corrected as shown below:

On the Title Page

Column 2, FOREIGN PATENT DOCUMENTS, Line 1, delete "1213408" and insert -- 7213408 --

Signed and Sealed this
Twenty-seventh Day of October, 2020

Andrei Iancu
*Director of the United States Patent and Trademark Office*